US 6,584,721 B1

(12) United States Patent
Reule et al.

(10) Patent No.: US 6,584,721 B1
(45) Date of Patent: Jul. 1, 2003

(54) DECOY COVER

(76) Inventors: Steve J. Reule, 515 Wolfe St., Elkhorn, NE (US) 68022; Jeff Kroger, 400 Cleveland Cir., Elkhorn, NE (US) 68022

( * ) Notice: Subject to any disclaimer, the term of this patent is extended or adjusted under 35 U.S.C. 154(b) by 0 days.

(21) Appl. No.: 10/225,265

(22) Filed: Aug. 20, 2002

(51) Int. Cl.⁷ ............................................. A01M 31/06
(52) U.S. Cl. ............................................................. 43/3
(58) Field of Search ........................................... 43/2, 3

(56) References Cited

U.S. PATENT DOCUMENTS

| 747,732 A | 12/1903 | Kremer |
| D229,306 S | 11/1973 | McGraw |
| 4,318,240 A | 3/1982 | Hillesland |
| 4,689,913 A | 9/1987 | Brice |
| 4,691,464 A | 9/1987 | Rudolph |
| 4,890,408 A | 1/1990 | Heiges et al. |
| 5,595,012 A | 1/1997 | Coleman |
| 5,613,317 A | 3/1997 | Ninegar |
| 6,115,953 A | 9/2000 | Wise |

*Primary Examiner*—Charles T Jordan
*Assistant Examiner*—Jordan M Lofdahl
(74) *Attorney, Agent, or Firm*—Thomte, Mazour & Niebergall; Shane M. Niebergall

(57) ABSTRACT

A decoy cover is disclosed for use with various animal decoys. The decoy cover is constructed from a flexible material having markings disposed on at least one side of the decoy cover that depict a species and/or sex of the animal corresponding to the decoy. In another embodiment, both surfaces of the decoy cover are provided with different species and/or sex markings. The markings on the opposing surfaces of the decoy cover are different from one another, allowing the user to reverse the decoy cover and change the species and/or sex of the decoy. The decoy cover can be used with decoy blanks to reduce the cost of the decoy. The decoy cover also revives the appearance of weathered decoys.

16 Claims, 3 Drawing Sheets

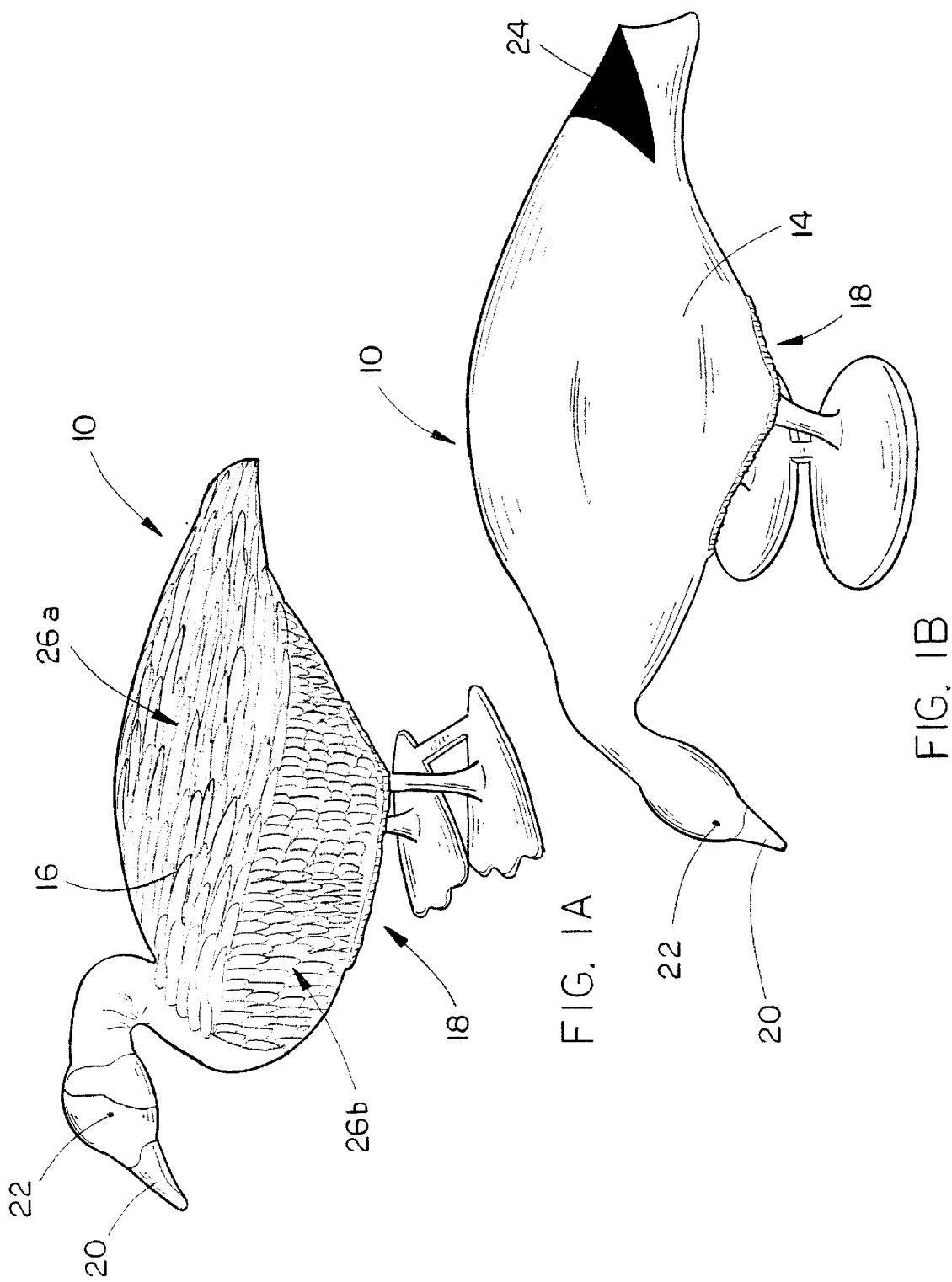

DECOY COVER

BACKGROUND OF THE INVENTION

1. Field of the Invention

The present invention relates to decoys and more particularly to a decoy cover that is used to quickly and inexpensively change the species and/or sex of the animal replicated by the decoy or refresh the weathered markings on used decoys.

2. Description of the Prior Art

Decoys have long been used to attract and even repel live animals for various purposes. Many types of decoys, resembling many different specifies of animals, have been previously designed. The majority of the prior art decoys are "full-bodied" and non-collapsible, which can eventually become a burden on the user who uses decoys throughout the year and in different locations. Such a user typically requires the decoys to resemble different species and sex of the particular animal. Accordingly, storing several different species and sex types of full-bodied decoys consumes an enormous amount of storage space, not to mention the expense of purchasing and maintaining the same.

The environment in which decoys are typically used will tend to "weather" the appearance of the decoys. This may include the fading of the colors and markings on the decoy as well as the scuffs and scratches caused by the storage, transport and use of the decoys. Ultimately, as the markings of the decoys weather, their realistic appearance diminishes, thus decreasing the value to the user.

Accordingly, what is needed is a decoy cover that can quickly and inexpensively change the species and/or sex of an existing decoy, revive the appearance of a weathered decoy, and even protect the existing markings on a decoy.

SUMMARY OF THE INVENTION

The decoy cover of the present invention is constructed of a flexible material having a size and shape approximating that of the decoy to be covered. The outer surface of the decoy cover is provided with markings of a certain species and sex of the animal corresponding to the decoy. In use, the decoy cover is placed over the decoy, much like a glove covering a hand. To the extent that the species or sex markings on the cover are different from the species markings on the decoy, the species or sex of the decoy has now been effectively changed. To the extent that the species or sex markings on the decoy were weathered, the decoy markings have now been revived.

In another embodiment, the inner surface of the decoy cover is provided with markings simulating the surface features of a species or sex of the animal corresponding to the decoy, different from the species or sex simulated by the markings on the outer surface of the decoy cover. The decoy cover is preferably constructed from a flexible material. Accordingly, the decoy cover is selectively reversible so that the user can select the species or sex of animal to be visible when the decoy cover is positioned on the decoy.

Due to the ability of the decoy cover to easily and inexpensively change the species of the decoy cover, the decoy cover can be used in conjunction with a decoy blank that has no species or sex markings whatsoever. Such a decoy blank will be far less expensive and complex to manufacture than most prior art decoys. Accordingly, the user is provided with an inexpensive, interchangeable decoy without the necessity of purchasing or maintaining other prior art decoys.

It is therefore a principal object of the invention to provide an improved decoy cover for changing the species or sex of the animal corresponding to the decoy.

A further object of the invention is to provide an improved decoy that provides two different sets of species and/or markings on the same decoy cover for use on a decoy.

Yet another object of the invention is to provide an improved decoy cover that can be used to revive the weathered appearance of a decoy.

Still another object of the invention is to provide a decoy cover that can be used with a decoy blank to easily and inexpensively provide a plurality of decoys of different species or sex using a single decoy.

Yet another object of the invention is to provide an improved decoy cover that protects the markings on an existing decoy.

A further object of the invention is to provide a decoy cover made from a flexible material so that it can accommodate decoys having different body positions or decoys having adjustable body positions.

Yet another object of the invention is to provide an improved decoy cover for changing the species or sex of the decoy that is easily cleaned and stored.

These and other objects will be apparent to those skilled in the art.

BRIEF DESCRIPTION OF THE DRAWINGS

FIG. 1A is a perspective view of a goose decoy and the decoy cover of the present invention as the same would exhibit a blue goose;

FIG. 1B is a perspective view of a goose decoy and the decoy cover of the present invention as the same would exhibit a snow goose;

DESCRIPTION OF THE PREFERRED EMBODIMENT

Figure 2A:
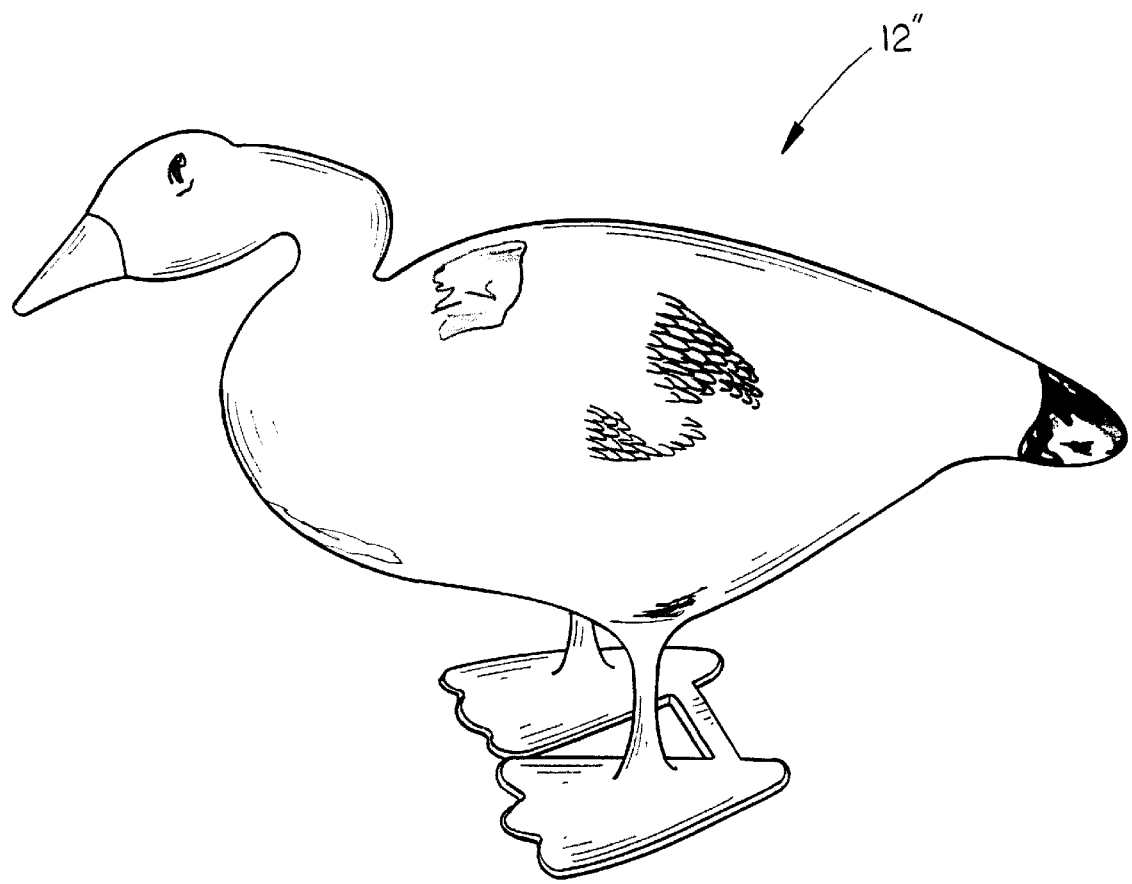
FIG. 2 is an exploded view of a decoy blank and an embodiment of the decoy cover of the present invention.
Figure 3:
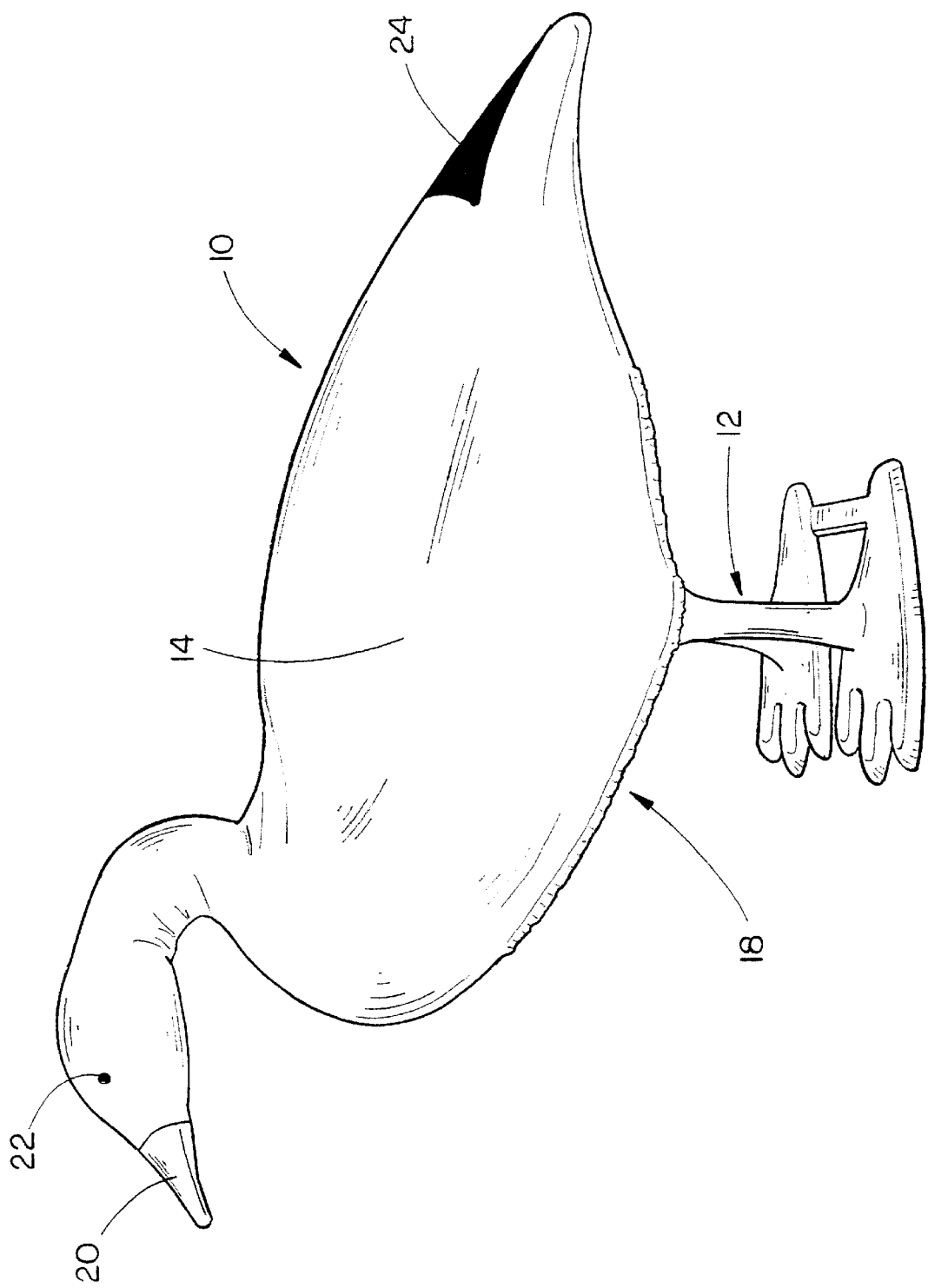
FIG. 3 is a side elevation view of a goose decoy and the decoy cover of the present invention.

The decoy cover of this invention is referred to generally by the reference numeral 10. For simplicity of description only, the decoy cover 10 and the decoy 12 of the present invention will be described as closely resembling a goose. It is contemplated that the decoy cover 10 and decoy 12 described herein are equally applicable to decoys resembling geese, ducks, turkeys, pheasants, quail, and nearly any other species of bird. Moreover, the present invention should not be construed as relating only to aviary decoys. The present invention is equally relatable to other decoys such as deer, elk, bear, and nearly any other type of animal for which decoys can be made.

The decoy cover 10 is preferably made from a flexible material. It is contemplated that the flexible material could be a fabric such as cotton, polyester, a nylon-Lycra blend, or other similar fabric. The flexible material could also be made from a plastic or rubber material. The flexible material is preferably formed to have a size and shape approximating that of the decoy 12. In its completed state, the decoy cover 10 will have a first surface 14, a second surface 16, and an opening 18. In this general construction, the decoy cover 10 will resemble a glove or open pocket.

The opening 18 formed in the decoy cover 10 should be made large enough to permit the passage of the decoy 12 therethrough, allowing the user to easily position the decoy cover 10 on the exterior surface of the decoy 12 and later remove the same. The edges of the opening 18 are preferably provided with an elastic gather and/or a known mechanical method of closing the opening 18, such as a hook and loop material fastener, snaps, zippers, buttons or the like.

The first surface 14 of the decoy cover 10 is preferably provided with markings simulating a species or sex of the animal corresponding to the decoy 12. In FIG. 1B, for example, the species shown is that of a snow goose, which relates to the goose decoy 12 beneath the decoy cover 10. It is contemplated that the markings could be applied to the decoy cover 10 using many different known methods and materials. For example, various inks, paints and dyes can be brushed, sprayed or silk-screened onto the decoy cover 10. It is further contemplated that pieces of fabric and other materials could be secured to the decoy cover 10 in a range of patterns. The pieces of material can also be secured to one another to form the decoy cover 10 itself.

Most animal decoys are provided with an exterior surface having markings of a particular species of animal. When used decoys have markings that have been "weathered," which would include the fading, chipping, scratching or other types of marring of the markings through age, use or other external force, it will be desirable to have the species or sex of animal depicted by the first surface 14 to match the species or sex of animal depicted by the external surface of the decoy 12. By doing so, the user has effectively refreshed the weathered appearance of the decoy 12 and restored its realistic appearance.

In those instances when a user desires a different species or sex of animal, the first surface 14 of the decoy cover 10 should be provided with markings simulating a species or sex different from the decoy 12. For example, an owner of a Canadian goose decoy can easily change the decoy to a snow goose decoy by positioning decoy cover 10, having a first surface 14 with snow goose markings disposed thereon, on the decoy 12, as shown in FIG. 1B.

In order to provide the user with greater flexibility and variety, it is preferred that the second surface 16 of the decoy cover 10 be provided with markings depicting a species and/or sex different from the species or sex depicted by the first surface 14. For example, the owner of a Canadian goose decoy could easily change the decoy to appear as a snow goose, as described previously, or change the decoy to resemble yet another species, such as a blue goose, as shown in FIG. 1A. Due to the flexible nature of the material, the user is able to easily reverse the decoy cover 10 so that either the first surface 14 or second surface 16 is visible when the decoy cover 10 is positioned on the decoy 12.

In another embodiment, the decoy cover 10 can be Used with a decoy blank 12'. The decoy blank 12' is more easily and inexpensively manufactured than the standard decoy 12 due to the fact that it is not provided with any markings on its exterior surface. Accordingly, as shown in FIG. 2, the decoy cover 10 completes the appearance of the decoy blank 12' by providing the desired features, such as a bill 20, eye 22, distinctive tail feather markings 24, or feather patterns 26A or 26B (shown in FIG. 1A). The decoy blank 12' simply provides the shape of the animal, in this example the shape is that of a goose having a distinctively-shaped head, neck, body, and tail portion.

In the drawings and in the specification, there have been set forth preferred embodiments of the invention; and although specified items are employed, these are used in a generic and descriptive sense only and not for purposes of limitation. Changes in the form and proportion of parts, as well as substitute of equivalents, are contemplated as circumstances may suggest or render expedient without departing from the spirit or scope of the invention as further defined in the following claims.

Thus, it can be seen that the invention accomplishes at least all of its stated objectives.

We claim:

1. In combination:
 a decoy having an exterior surface, said decoy having a shape resembling an animal; and
 a decoy cover having first and second surfaces and a shape similar to the decoy;
 said first surface of said decoy cover having a first set of markings thereon to simulate a plurality of surface features of the animal corresponding to the decoy;
 said second surface of said decoy cover having a second set of markings thereon to simulate the surface features of the animal corresponding to the decoy;
 said decoy cover being adapted to selectively removably cover at least a portion of the exterior surface of said decoy;
 said decoy cover being selectively reversible so that said first or second surface of said decoy cover is visible when said decoy cover is positioned on the decoy.

2. The combination of claim 1 wherein the exterior surface of the decoy has no markings to simulate the surface features of the animal corresponding to the decoy.

3. The combination of claim 1 wherein the exterior surface of the decoy has a plurality of weathered markings thereon relating to the surface features of the animal corresponding to the decoy.

4. The combination of claim 1 wherein the exterior surface of the decoy has markings thereon to simulate the surface features of a first species of the animal corresponding to the decoy and the first set of markings on the first surface of the decoy cover simulate a second species of said animal.

5. The combination of claim 4 wherein the second set of markings on the second surface of the decoy cover simulate a third species of the animal corresponding to the decoy.

6. The combination of claim 1 wherein the exterior surface of the decoy has markings thereon to simulate the surface features of a first sex of the animal corresponding to the decoy and the first set of markings on the first surface of the decoy cover simulate a second sex of said animal.

7. The combination of claim 1 wherein the exterior surface of the decoy has markings thereon to simulate the surface features of a first species and a first sex of the animal corresponding to the decoy and the first set of markings on the first surface of the decoy cover simulate a second species and a second sex of said animal.

8. The combination of claim 7 wherein the second set of markings on the second surface of the decoy cover simulate a third species of the animal corresponding to the decoy.

9. A removable cover for a decoy having an exterior surface with markings simulating surface features of a first species and a first sex of an animal corresponding to the decoy, the cover comprising:
 a flexible material, having first and second surfaces, formed to have a shape and size approximating the decoy;
 said first surface of said material having markings simulating surface features of a second species of the animal corresponding to the decoy;
 said cover being adapted to removably cover at least a portion of the exterior surface of the decoy;

said cover being selectively reversible so that said first or second surface of said material is visible when said cover is positioned on the decoy.

10. The cover of claim 9 wherein the second surface of said material is provided with markings simulating surface features of a third species of the animal corresponding to the decoy.

11. The cover of claim 9 wherein the markings on the first surface of said material simulate a second sex of the animal corresponding to the decoy.

12. The cover of claim 11 wherein the second surface of said material is provided with markings simulating surface features of a third species of the animal corresponding to the decoy.

13. A decoy, comprising:
   a decoy blank having a shape resembling an animal; and
   a decoy cover, having first and second surfaces, formed to have a shape and size approximating the decoy blank;
   said first surface of said decoy cover having a first set of markings thereon to simulate surface features of the animal corresponding to the decoy blank;
   said decoy cover being adapted to removably cover at least a portion of the exterior surface of the decoy blank;
   said decoy cover being selectively reversible so that said first or second surface of the decoy cover is visible when the decoy cover is positioned on the decoy blank.

14. The decoy of claim 13 wherein the second surface of the decoy cover is provided with a second set of markings thereon to simulate surface features of the animal corresponding to the decoy blank.

15. The decoy of claim 13 wherein the first set of markings on the first surface of the decoy cover simulate a first species and a first sex of the animal corresponding to the decoy blank and the second set of markings on the second surface of the decoy cover simulates a second species of said animal.

16. The decoy of claim 15 wherein the second set of markings on the second surface of the decoy cover simulates a second sex of the animal corresponding to the decoy blank.

* * * * *